United States Patent [19]

Hopfe et al.

[11] Patent Number: 5,595,818
[45] Date of Patent: Jan. 21, 1997

[54] ROUGH-SURFACED POLYVINYL BUTYRAL SHEET AND METHOD OF FORMING SAME

[75] Inventors: Harold H. Hopfe, Longmeadow; Aristotelis Karagiannis, Northampton, both of Mass.

[73] Assignee: Monsanto Company, St. Louis, Mo.

[21] Appl. No.: 387,855

[22] PCT Filed: Sep. 17, 1993

[86] PCT No.: PCT/US93/08859

§ 371 Date: Feb. 27, 1995

§ 102(e) Date: Feb. 27, 1995

[87] PCT Pub. No.: WO95/07940

PCT Pub. Date: Mar. 23, 1995

[51] Int. Cl.⁶ .............................. B32B 5/16; B32B 27/30; C08F 8/28
[52] U.S. Cl. .............. 428/327; 264/176.1; 428/141; 428/436; 428/437; 524/502; 524/503; 525/154; 525/155
[58] Field of Search .................. 428/327, 436, 428/437, 141; 264/176.1; 524/143, 314, 296, 297, 502, 503; 525/154, 155

[56] References Cited

U.S. PATENT DOCUMENTS 4,654,179 3/1987 Cartier et al. ............... 264/176.1
5,482,767 1/1996 Karagiannis et al. ............ 428/327

FOREIGN PATENT DOCUMENTS 1926643 12/1970 Germany .

*Primary Examiner*—D. S. Nakarani
*Attorney, Agent, or Firm*—Michael J. Murphy

[57] ABSTRACT

In preparing rough-surfaced sheet of polyvinyl butyral (PVB), a fraction of stiffly resilient particles of crosslinked PVB are present in the formulation which on exiting an extrusion die opening mechanically interfere with and roughen the surface of the sheet being formed.

13 Claims, 1 Drawing Sheet

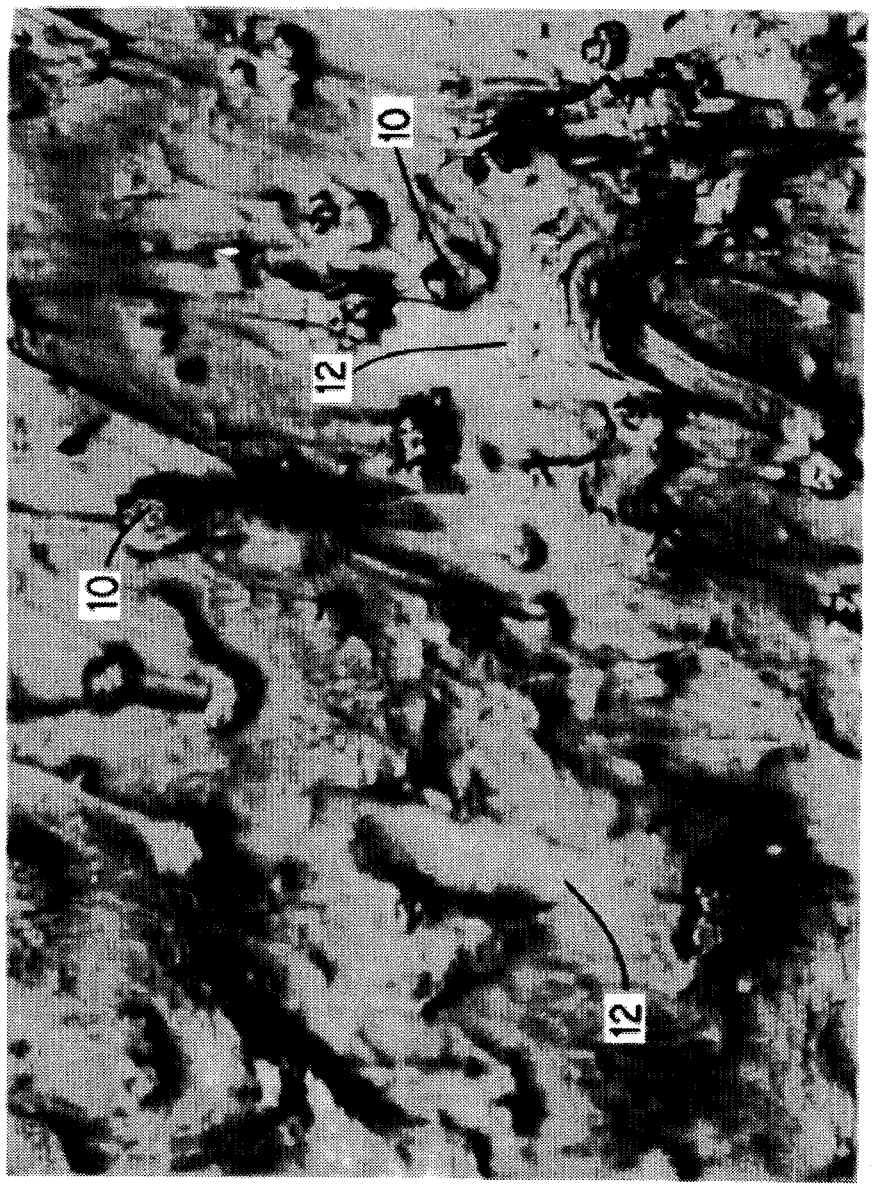

ROUGH-SURFACED POLYVINYL BUTYRAL SHEET AND METHOD OF FORMING SAME

BACKGROUND OF THE INVENTION

This invention relates to sheet containing polyvinyl butyral (PVB) and more particularly to the roughened surface of such sheet and to a process for producing it.

Plasticized sheet containing PVB is known as an impact-dissipating layer for use with glass or rigid plastic panels (hereinafter "laminating panel(s)") in laminated safety glazings.

It is likewise known to roughen the major planar surface(s) of such sheet to facilitate deairing during preparation of such laminated glazings. More particularly, minute channels between the smooth surface of the laminating panel and the extremities of minute valleys in the face of a rough surface of the contiguous PVB sheet permit air between the two members to escape when pressure or vacuum is applied to the interface.

U.S. Pat. No. 4,654,179 discloses crosslinked PVB for generating surface roughness during extrusion. A single PVB phase is used with roughness described therein as a function of PVB molecular weight distribution, the broader the distribution obtained by increasing the crosslink level, the lower the magnitude of surface roughness. In such '179 patent, crosslinked and uncrosslinked PVB are chemically, molecularly integral in a homogenous mass. According to this patent, roughness is adjusted by changing crosslinking agent concentration used during synthesis of the PVB, the greater such concentration the lower the sheet roughness.

While this technique has been successful, it would be desirable to provide a more versatile way to regulate PVB sheet roughness using crosslinked PVB which does not solely rely on changing the chemistry of the resin during its synthesis.

SUMMARY OF THE INVENTION

Now improvements have been made in roughening one or both surfaces of PVB sheet which mitigate shortcomings of the prior art.

Accordingly, a principal object of this invention is to provide PVB sheet having a rough surface wherein crosslinked PVB is responsible for generating roughness.

Another object is to provide a tractable process for making such PVB sheet wherein the parameters defining roughness quality (including amplitude and pitch) can be readily changed.

Other objects will in part be obvious and will in part appear from the following detailed description and claims.

These and other objects are accomplished by a sheet comprising a plasticized polyvinyl butyral matrix containing discrete particles of crosslinked PVB which are integrally, randomly dispersed in the matrix and microscopically protrude from the surface of the sheet forming a rough surface thereon. The amount of the particle fraction is preferably 1 to 40 weight percent of the combined weight of matrix and particles; the size of the particles is 1 to 100 microns and the stiffness, measured by the concentration of crosslinking agent present in synthesizing the particles, is that resulting from a concentration of about 0.06 to 0.30 parts crosslinking agent per 100 parts polyvinyl alcohol.

Also provided in the process of preparing PVB sheet by extruding a plasticized formulation containing PVB through a die opening is the step in combination therewith of adding to the formulation before extrusion, a fraction of stiffly resilient particles of crosslinked PVB which during extrusion form a different phase from the balance of the PVB of the formulation and which on exiting the die opening mechanically interfere with and roughen the surface of the sheet being formed.

BRIEF DESCRIPTION OF THE DRAWINGS

In describing the overall invention, reference will be made to the accompanying drawing which is a photomicrograph of the surface of sheet according to the invention taken at a magnification of 100 times.

DETAILED DESCRIPTION OF THE INVENTION

The formulation of the sheet of the invention is a heterogeneous polymer mixture comprising first and second PVB components admixed with plasticizer, the first PVB component forming a matrix phase in which a minor weight amount (based on the combined weight of the first and second components) of particles of the second PVB component are dispersed, the second polyvinyl butyral component containing crosslinked polyvinyl butyral. The matrix phase is uncrosslinked PVB or lightly crosslinked, relative to the dispersed phase, or a mixture of uncrosslinked and lightly crosslinked PVB. The dispersed PVB phase is rheologically different from the matrix in being more crosslinked and in particulate form is stiffly resilient in comparison with the matrix during melt shaping into sheet. This is depicted in FIG. 1 where particles 10 are in the surface of the extruded sheet and 12 is the matrix. The greater crosslinked, dispersed particulate phase has a melt shear viscosity adequate to preserve the integrity of the particles in the two phase heterogeneous mixture during extrusion and thereafter in the formed sheet. Such melt shear viscosity (20 sec.$^{-1}$) is preferably at least three times (most preferably at least five times) greater than the matrix phase. This viscosity difference prevents the stiffly resilient particles from homogenizing with the matrix during melt processing, i.e. the more crosslinked phase maintains its integrity though in the molten state during extrusion.

The performance of the heterogenous blend is unexpected in preserving the particulate form of the dispersed phase in the shaped sheet (FIG. 1) as opposed to its absence when either the continuous or dispersed phase is alone used. This is a departure from the PVB formulations of U.S. Pat. No. 4,654,179 wherein sheet formed entirely of the matrix of FIG. 1 and sheet formed entirely of the dispersed phase of FIG. 1 is homogenous, i.e. the dispersed particles are absent. The stiff, dispersed phase of the heterogenous mixture provides fracture sites to roughen the surface as the extruding formulation exits the die opening. More particularly, as pressure on the extruding formulation is released as it is expelled through the die opening into a surrounding atmosphere, portions of particles of the dispersed phase are dislodged from the lower viscosity matrix to mechanically interfere and roughen the surface of sheet being formed. This is depicted in FIG. 1 wherein the plastic of the sheet has set and randomly dispersed particles 10 of crosslinked PVB are shown integral with and embedded in the matrix and which inseparably microscopically protrude from the major plane (i.e. which would exist with no surface disturbance) of the sheet, thereby forming the rough surface thereon.

Surface roughness is formed by a multitude of microscopic peaks and valleys and is defined by peak frequency (i.e. the number of peaks in a given direction and distance) and peak height (or amplitude). Such roughness in the invention is a function of the size, stiffness and number of particles of the dispersed phase. Each of these parameters has some effect on peak frequency and height. Peak frequency is correlatable to the number of fracture sites and is strongly influenced by the amount or number of particles of dispersed phase present, such frequency increasing as the concentration of dispersed phase increases. Thus, more peaks are formed over a set distance (for a given size distribution and rigidity of particles) as the concentration of disperse phase in the extruding formulation increases. Though the amount of the fine particle fraction can be up to 50 weight % of the total weight of PVB in the formulation, the preferred concentration is between 1 to 40%, most preferably 3 to 20%. Within these ranges, a desirably high frequency is obtained which permits good deairing during the laminating process. At a disperse phase concentration below 1 weight % (based on the combined weight of matrix and disperse phase) frequency is predicted to be unaffected; increasing such concentration beyond 40 to 50% results in a formulation too difficult to extrude which is uneconomical in producing no significant effect.

Peak height of surface roughness is predominately a function of the size and stiffness of dispersed phase particles, the larger and stiffer the particles, the greater the peak height. As the level of crosslinking (controlled by crosslinking agent concentration during synthesis) increases, it is believed that the size of individual crosslinked particles increases. Since the resin as made (before extrusion) is usually in the form of agglomerates of individual particles, the size of unagglomerated particles is not conveniently measured. Such agglomerates, however, are broken up during melt processing in forming the sheet. For non-agglomerated particles, particle size may be set by screening the unmixed dispersed phase to remove particles above a predetermined size. Such screening, however, may not be necessary when the desired size distribution is obtained during the synthesis reaction forming the crosslinked material of the dispersed phase. Particle stiffness is also a function of the level of crosslinking of the particles of the dispersed phase and is measured by the concentration of crosslinking agent present during the synthesis reaction between polyvinyl alcohol (PVOH) and butyraldehyde forming the particles.

Generally, roughness peak height for good deairing without premature collapse of peaks is obtained when dispersed phase particle size distribution is between 1 and 100 microns, preferably 1 to 50 microns. Particles greater than 100 microns may result in optical defects, i.e. hard spots (opaque discontinuities) visually apparent in the finished laminated safety glazing. Submicron particles do not provide adequate roughness for the desired degree of deair performance. Acceptable particle stiffness is obtained with a concentration of crosslinking agent during synthesis at least three times greater than used (if any) in forming the matrix phase. Such concentration is preferably 0.06 to 0.30, most preferably 0.08 to 0.20 parts crosslinking agent per 100 parts PVOH.

Sheet of the invention (after the plastic forming same is cooled and set) appears milky white and opaque to the eye from light scattering from the peaks forming the rough surface, such peaks also being susceptible to touch. This roughness and opacity are temporary and are destroyed when the PVB of the sheet melts during preparation at elevated temperature of a prelaminate and thereafter at high temperature and pressure in forming the final laminate with one or more laminating members such as glass. After final laminating, a highly optically transparent, substantially haze-free structure is obtained wherein crosslinked particles are visually indistinguishable from and optically identical to the matrix PVB since the refractive index of the particles is a very close match with that of the matrix, typically varying only by ±0.0003 (or less) refractive index units. Such laminating is conventional in the art and is not part of the present invention.

The heterogenous PVB mixture for forming the sheet of the invention is prepared by mechanically mixing the two phases, either dry without melting followed by melt shaping of the mixture or by mixing the phases in a high intensity mixer where some melting may occur followed by melt extrusion.

The rough-surfaced sheet of the invention has a noncritical thickness of about 5 to 60 mils (0.13 to 1.52 mm).

With respect to crosslinked PVB usable herein, the chemical reaction of crosslinking agent(s) with PVOH to produce intermolecular cross linkages is disclosed in U.S. Pat. No. 4,654,179, col. 2, lines 20–48, the content of which is incorporated herein by reference. Any crosslinking agent (including mixtures of crosslinking agents) is usable which contains active groups capable of interacting with a pair of hydroxyl groups on each of two neighboring PVOH molecular chains to form stable intermolecular linkages. Operable crosslinking agents include diepoxides such as diglycidyl ether bisphenol A; aldehydes containing at least two CHO groups such as dialdehydes and trialdehydes and the like. PVB crosslinked by monobutyral bonds as disclosed in published Japanese Kokai 5-25213, laid open Feb. 2, 1993, may be used. Preferred crosslinking agents are dialdehydes, for example oxaldehyde and the more complex dialdehydes, and trialdehydes containing aliphatic (with or without unsaturation), aromatic or mixed aliphatic/aromatic groups between carbonyl linkages of the CHO groups. Specific functional dialdehydes include aliphatic aldehydes such as propanedial, succinaldehyde, adipaldehyde, 2-hydroxyhexanedial, etc.; aromatic dialdehydes including phthaldehyde, 1,4-benzenediacetaldehyde, 4,4-(ethylenedioxy) dibenzaldehyde, 2,6-napthathalene dicarbaldehyde, etc. Operable trialdehydes include N,N'N"-(3,3', 3"-trisformylethyl) isocyanurate and the like. Mixtures of the foregoing and other crosslinking agents are also suitable. Preferred dialdehydes are selected from the group consisting of glutaraldehyde, 4,4'(ethylenedioxy) dibenzaldehyde and 2-hydroxyhexanedial. Glutaraldehyde is most preferred.

Crosslinking occurs substantially in conjunction with formation of PVB through condensation of PVOH with butyraldehyde. The concentration of crosslinking agent to provide crosslinked PVB varies with molecular weight of the crosslinking agent the higher such molecular weight the greater the amount required. For the preferred di and trialdehydes, the concentration used should be about 0.06 to about 0.30 most preferably 0.08 to 0.20 parts per hundred parts PVOH. Crosslinked PVB resin is produced by known aqueous or solvent acetalization wherein PVOH is reacted with butyraldehyde in the presence of an acid catalyst to produce PVB, followed by neutralization of the catalyst, separation, stabilization and drying of the PVB resin. Depending on rate of reaction, the crosslinking agent is added to the catalyzed condensation reaction mixture before or simultaneously with the butyraldehyde. In a solvent system, the sequence of addition may be somewhat different; for example, it may be necessary to add the crosslinking agent after the PVB is in solution. Alternatively, in situ crosslinking of initially uncrosslinked PVB is also within the scope of the invention. For example, uncrosslinked PVB is made by the solvent process and then, with the uncrosslinked PVB in solution in the synthesis reaction vessel, a charge of acid catalyst and crosslinking agent (e.g. tetra ethyl ortho silane) at appropriate concentration is made to such reactor to crosslink the PVB resin contents. The crosslinked PVB phase of the formulation of the sheet in FIG. 1 is made in this manner.

In a solvent process, acetalization is carried out in the presence of sufficient solvent to dissolve the PVB and produce a homogeneous solution at the end of acetalization. The PVB is separated from solution by precipitation of solid particles with water which are then washed and dried. Solvents used are lower aliphatic alcohols such as ethanol.

In an aqueous process, acetalization is carried out by adding butyraldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeded to the desired end point.

In forming the sheet, the PVB mixture is plasticized with from about 20 to 80 parts plasticizer per hundred parts of PVB, typically between 25 to 45 parts for conventional laminated safety glazing use. This latter concentration is generally used with polyvinyl butyrals containing 17 to 25% vinyl alcohol by weight. In general, PVB plasticizers commonly employed are esters of a polybasic acid or a polydydric alcohol. Particularly suitable plasticizers are triethylene glycol di-(2-ethyl butyrate), dihexyl adipate, dioctyl adipate, mixtures of heptyl and nonyl adipates, dibutyl sebacate, polymer plasticizers such as the oil-modified sebacid alkyds, and mixtures of phosphates and adipates such as disclosed in U.S. Pat. No. 3,841,890 and adipates and alkyl benzyl phthalates such as disclosed in U.S. Pat. No. 4,144,217. Also usable are the mixtures disclosed in U.S. Pat. No. 5,013,780. Other suitable plasticizers are well known or will be obvious to those skilled in the art. Plasticizer amount absorbed by the dispersed phase may vary with crosslink level and the time, intensity and temperature of mixing.

The sheet is prepared using systems known to those skilled in the art, e.g. by extrusion through a conventional sheeting die, preferably having surface-cooled die lips to fine tune the roughness provided by the present invention. In this regard, such lip cooling may be unnecessary once the previously described resin parameters effecting roughness are optimized. More particularly the premixed heterogeneous blend as molten polymer fluid (at a temperature of about 175° to 215° C.) is forced through a horizontally long, vertically narrow die opening substantially conforming in length and width to that of the sheet being formed. Alternatively, instead of batch premixing of the two PVB components, the matrix and dispersed phases may be separately charged to a mixing extruder and processed into sheet as just described. An extrusion system employing a die roll to form the sheet is also usable, i.e. the polymer is cast onto a specially prepared surface of a die roll positioned in close proximity to the exit of such die or forming a surface of such die, such as shown in FIGS. 5 and 6 of U.S. Pat. No. 4,112,166 and further described therein.

In addition to plasticizers, sheet according to this invention may contain other additives such as dyes, ultraviolet light stabilizers, salts to control adhesion, antioxidants and may, if desired, be treated with additives to improve laminating efficiency. The sheet may optionally have a colored anti-glare PVB gradient band along one side adjacent its edge which may be incorporated into the sheet using the system disclosed in U.S. Pat. No. 4,316,868, the content of which is incorporated herein by reference.

Roughness properties in Examples following were measured using a Model S8P Perthometer from Mahr Corporation, Cincinnati, Ohio which used a tracing stylus to measure actual roughness. In this regard, $R_z$ (in microns, µ), defined according to DIN 4768 (May 1990), is the average peak to valley height which is the arithmetic mean of the individual peak to valley height values of five individual measurement lengths $l_e$ aligned together. $l_e$ can be set as desired and is 2.5 mm herein. Frequency is characterized in this system according to DIN 4762 in terms of the average distance between profile irregularities $(S_m)$ (µ) within a reference length $l_m$ wherein $l_m$ can be set as desired and is 12.5 mm herein. In measuring $S_m$, a parameter called $R_a$ is used which is the arithmetic average of all departures of the roughness profile from the mean line within the evaluation length $l_m$.

Melt shear viscosity (at 20 sec.$^{-1}$) was measured using a capillary extrusion rheometer, Instron Model #4208, capillary length=1.246 in. (3.16cm), diameter=0.025 in. (0.064cm), entrance angle=90°.

The invention is further described in the following examples which are for illustration only and are not intended to imply any limitation or restriction on the invention. Unless otherwise indicated, all quantities are expressed by weight.

EXAMPLES 1–4

Preparation of Crosslinked PVB Resin.

Polyvinyl alcohol (PVOH) resin having a residual polyvinyl acetate content of less than 2% is dissolved with agitation in water at 90°–95° C. to form an 8% solution. 5524 Kg of this PVOH solution is charged to an agitated reactor and its temperature adjusted to 18° C. To this solution is added 267 kg of butyraldehyde and various amounts (See Table 1 following) of a 50% aqueous solution of glutaraldehyde which decreases the temperature to about 12° C. 16 kg of a 35% water solution of nitric acid is then charged and the mixture held for 30 min. at between 12° and 16° C. A second charge of 46.5 kg of nitric acid is added 1 hr after the initial nitric acid charge. After 30 min. the mixture is heated over 45 min. to 87° C. and held there for 3 hr. The contents of the reactor is washed with water at 75° C. to a pH of 4.0. Potassium hydroxide water solution is then charged to provide a pH of 9.5–10.5 and the contents held at this pH for 2 hr at 75° C. Additional water at 75° C. is then added to decrease the pH to 7.5. The PVB slurry is centrifuged and dried to less than 2% moisture. The melt shear viscosity of the PVB resin plasticized with 32 parts dihexyl adipate per 100 parts resin is measured at 204° C. and the following results obtained:

TABLE 1

| Ex. | Glutaraldehyde Wt/per cwt of PVOH | PVB Melt Shear Viscosity (Pa · s) 20 sec$^{-1}$ |
|---|---|---|
| 1 | 0.01 (matrix) | 950 |
| 2 | 0.100 | 4796 |
| 3 | 0.120 | 5884 |
| 4 | 0.135 | 7417 |

The increase in melt shear viscosity shows that stiffness of the resin has increased from crosslinking with use of the glutaraldehyde. Resin of Exs. 2, 3 and 4 constitute the dispersed phase in the following examples.

EXAMPLE 5

Preparation of Rough-Surfaced PVB Sheet.

Using a high intensity mixer, 32 parts dihexyl adipate are mixed with 90 parts PVB resin of Ex. 1 (0.01 pph glutaraldehyde) and 10 parts PVB resin of Ex. 4 (0.135 pph glutaraldehyde). The plasticized heterogeneous PVB mixture is then melted in an extruder and forced in melt form through a sheeting die having a rectangular die opening at its forward end delimited by a pair of opposing die lips, the surfaces of which (by internal circulation of a temperature control fluid) are maintained at 163° C. The melt is at about 194° C. and the pressure at the die opening is 967 psi (6667 kPa). The extruded sheet thickness is about 0.76 mm and it issues from the die at about 10.5 fpm (3.2 mpm). Each side of the extruded sheet is formed with a rough surface. Measurements show $R_z$ is 63.3 microns.

The above is in contrast with sheet formed entirely of the resin of Example 1 (resin as disclosed in U.S. Pat. No. 4,654,179—no disperse phase) using the above sheet forming procedure for which $R_z$ is 20.1 microns.

EXAMPLE 6

The procedure of Example 5 is repeated at constant (10%) dispersed phase concentration at different levels of crosslinking of the dispersed phase. The degree of crosslinking is measured as a function of the concentration of glutaraldehyde employed in synthesizing the cross-linked dispersed phase. Results are as follows:

| Conc. of glutaraldehyde (parts per 100 parts PVOH) | Rz (μ) |
|---|---|
| 0.100 | 31.9 |
| 0.120 | 39.6 |
| 0.135 | 63.3 |

The above shows that as particle stiffness (defined by extent of crosslinking or melt shear viscosity of dispersed phase) increases, $R_z$ increases.

EXAMPLE 7

This shows the effect of dispersed phase concentration on frequency.

Using a high intensity mixer, 32 parts dihexyl adipate are mixed with PVB resin (no crosslinking agent) and different ratios of the resin of Ex. 2 (0.100 pph glutaraldehyde). The plasticized heterogenous PVB mixture is then melted in an extruder and forced in melt form through a die opening onto the surface of an adjacent rotating die roll which is at 63° C. The temperature of the die blade in contact with the polymer melt on the side opposite the die roll is about 149° C. Melt temperature is about 198° C. and the pressure of the die is about 380 psi. (2620 kPa) Sheet at about 0.8 mm thickness issues from the die roll at about 4.5 mpm. Each side of the extruded sheet is formed with a rough surface. $R_z$ and $S_m$ of the sheet side opposite that in contact with the die roll are measured and results are as follows:

| Crosslinked Resin Ratio (%) | $R_z$ | $R_a$ | $S_m$ |
|---|---|---|---|
| 10 | 40 | 5.2 | 402 |
| 20 | 36 | 5.5 | 332 |

The above shows peak frequency as a function of dispersed phase concentration with $S_m$ (distance between peaks) decreasing (and therefore frequency of peaks increasing) as dispersed phase increases. At relatively constant $R_a$, $S_m$ will decrease with increased dispersed phase content. However, if the $R_a$ value increases by a large amount, the desired reduction in $S_m$ may not be noted because of the relationship between $R_a$ and $S_m$.

EXAMPLE 8

This simulates the effect of dispersed phase particle size on $R_z$.

The procedure of Example 5 is repeated except that instead of crosslinked PVB particles, glass beads (or ground glass powder) of known particles size are used with the PVB of Example 1 (matrix) at a 5/95 glass/matrix ratio to simulate performance of the crosslinked dispersed phase. Results are as follows:

| Glass Bead Size (microns) | $R_z$ (microns) |
|---|---|
| No Beads | 21.5 |
| up to 38 | 31.0 |
| 45–70 | 37.1 |
| 45–90 | 49.4 |

The above shows that as particle size increases, $R_z$ increases. Though glass beads are used in this Example, the mechanism of roughness formation should be the same using crosslinked PVB dispersed phase. The same effect is postulated with replacement of the glass with crosslinked PVB of varying particle size, such size believed to vary (directly proportional) with extent of crosslinking. Crosslinked PVB was not used because of the difficulty in measuring particle size in the sheet when the refractive indices of the matrix and dispersed phases are essentially matched.

The foregoing Examples illustrate the principal attribute of the invention as a versatile technique for adjusting sheet roughness parameters downstream of resin synthesis by altering the ratios of separately prepared, rheologically different dispersed and matrix phases of a heterogeneous blend of PVB's constituting the formulation of the sheet.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. Plasticized sheet comprising a polyvinyl butyral matrix containing discrete particles of crosslinked polyvinyl butyral which are integrally randomly dispersed in the matrix and microscopically protrude from the surface of the sheet forming a rough surface thereon.

2. The sheet of claim 1 wherein the size of the particles is 1 to 100 microns.

3. The sheet of claim 2 wherein the fraction of particles present is 1 to 40 weight percent of the combined weight of matrix and particles.

4. The sheet of claim 3 wherein the particles of crosslinked polyvinyl butyral have a melt shear viscosity at 20 sec.$^{-1}$ at least three times greater than that of the matrix.

5. The sheet of claim 2 wherein the extent of crosslinking of the polyvinyl butyral of the particles is defined by the concentration of crosslinking agent present during a reaction between polyvinyl alcohol and butyraldehyde forming such particles, such concentration being from about 0.06 to 0.30 parts crosslinking agent per 100 parts polyvinyl alcohol.

6. The sheet of claim 5 wherein the crosslinking agent is glutaraldehyde.

7. In the process of preparing polyvinyl butyral sheet by extruding a plasticized formulation containing polyvinyl butyral through a die opening, the step in combination therewith of adding to the formulation before extrusion, a fraction of stiffly resilient particles of crosslinked polyvinyl butyral which during extrusion form a different phase from the balance of the polyvinyl butyral of the formulation and which on exiting the die opening mechanically interfere with and roughen the surface of the sheet being formed.

8. The process of claim 7 wherein the size of the particles is between 1 to 100 microns.

9. The process of claim 8 wherein the fraction is 1 to 40 weight percent of the combined weight of i) polyvinyl butyral and ii) the particles of crosslinked polyvinyl butyral.

10. The process of claim 9 wherein the particles of crosslinked polyvinyl butyral have a melt shear viscosity at 20 sec.$^{-1}$ at least three times greater than that of the matrix.

11. The process of claim 8 wherein the extent of crosslinking of the polyvinyl butyral of the particles is defined by the concentration of crosslinking agent present during a reaction between polyvinyl alcohol and butyraldehyde forming such particles, such concentration being from about 0.06 to 0.30 parts crosslinking agent per 100 parts of polyvinyl alcohol.

12. The process of claim 11 wherein the crosslinking agent is glutaraldehyde.

13. Plasticized sheet comprising a polyvinyl butyral matrix containing discrete particles of crosslinked polyvinyl butyral integrally randomly dispersed in the matrix throughout the thickness of the sheet.

* * * * *